June 3, 1969   H. S. PIEN   3,447,362
COMPENSATED SEMICONDUCTOR STRAIN GAGE TRANSDUCERS
Filed April 26, 1965   Sheet 2 of 2

INVENTOR.
HSIA S. PIEN
BY
Dike, Thompson, Bronstein & Mrose
ATTORNEYS

United States Patent Office 3,447,362
Patented June 3, 1969

3,447,362
COMPENSATED SEMICONDUCTOR STRAIN
GAGE TRANSDUCERS
Hsia S. Pien, 104 Harding St., Newton, Mass. 02158
Filed Apr. 26, 1965, Ser. No. 453,880
Int. Cl. G01n 27/00; G01l 1/22, 5/10
U.S. Cl. 73—88.5          6 Claims

ABSTRACT OF THE DISCLOSURE

A transducer involving a force-responsive member is equipped with semiconductor strain gages connected in a bridge network which is compensated for the different temperature-coefficient patterns of the gages, without being unbalanced and without requiring temperature-sensitive compensators, by a first external resistance which is in series with one of the gages and of constant value low in relation to the gage resistances, and by a second external resistance which is in shunt relation to one of the gages and of constant value high in relation to the gage resistances.

---

Figure 1:
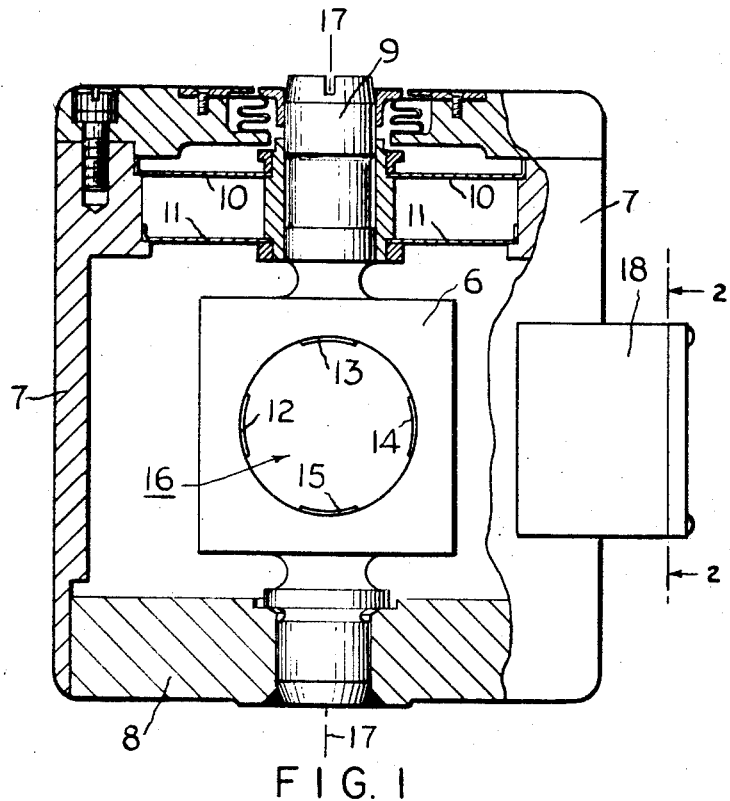

The present invention relates to improvements in the compensation of strain gage transducers for error-inducing effects of mismatched temperature coefficients of cooperating strain gage elements, and, in one particular aspect, to novel and improved hermetically-sealed transducers incorporating semiconductor strain gages having unmatched temperature-coefficient characteristics and which are rendered highly precise by auxiliary resistance elements externally connected with the terminals of a specially-provided open-cornered semiconductor bridge circuit.

As is well known in the current state of the strain gage transducer art, electrical semiconductor strain gages are highly attractive as sensing elements which may be substituted for the more conventional wire or foil gages for many applications. In general, it is also desirable that load cells or like transducers, involving electrical strain gages affixed to surfaces of an enclosed member stressed by applied loads, be fully assembled and hermetically sealed at an early stage of manufacture to avoid disturbances, such as those which might be caused by corrosion and contamination, and to permit factory testing of the unit while it is in the substantially completed physical form in which it is to be used. Unfortunately, many semiconductor gages which possess substantially the same temperature-coefficient patterns nevertheless also exhibit actual values of temperature-induced resistance changes which are significantly different and thus tend to promote serious temperature-induced errors in the outputs of the bridge circuits in which they are incorporated. To some extent, problems of this type may be alleviated by prematching those semiconductor gages which are to be used together, although this routine approach obviously entails labor and expense which it would be desirable to avoid. In accordance with the present teachings, however, such difficulties are advantageously eliminated by constructing transducers with semiconductor gages which are not necessarily matched as to their actual resistance changes with temperature, leaving one corner of their internally-connected bridge circuitry open and bringing both leads thereof through the hermetic sealing to the exterior of the unit where shunt and series connections of simple substantially-constant resistances are made, the latter resistances being proportioned and positioned to effect both correction for temperature coefficient mismatch and bridge rebalancing necessitated by the correction.

It is one of the objects of the present invention, therefore, to provide novel and improved semiconductor-gage transducers wherein effects of unmatched temperature-induced variations in gage resistances are simply and economically overcome.

Another object is to provide a unique sealed force-measuring transducer having an open-cornered bridge circuit including semiconductor strain gages exhibiting different resistance vs. temperature characteristics and having externally-connected resistances which are substantially insensitive to temperature changes and yet correct for the different strain gage characteristics while preserving bridge balance.

Further, it is an object to provide semiconductor strain gage force transducers of economical manufacture wherein simple shunt and series resistances having negligible temperature coefficients are interposed externally in the bridge circuitry to proudce highly precise compensation for differences in strain gage temperature coefficients without substantially affecting bridge balance.

By way of a summary account of practice of this invention in one of its aspects, there is provided a generally conventional form of load cell wherein a ring-shaped load-responsive member is sealed within a housing by way of flexible diaphragms and carries four electrical semiconductor strain gage elements at quadrantally-spaced positions about the interior of its load-responsive ring, where two of the gages will respond to strains in compression and two will respond simultaneously to strains in tension about the ring. In conventional fashion, the four gages are electrically interconnected, within the cell housing, to form three of the usual four junctions or "corners" between adjacent bridge arms; however, the fourth corner or junction is intentionally left unconnected, and, instead, the strain gage leads which would normally be interconnected within the sealed housing are separately brought to the exterior, together with leads from the other three internal bridge junctions or interconnected corners. Bridge outputs may of course be affected, in either of two possible senses, by changing the relative values of impedance in two adjacent arms, such as the two arms which form the "open" corner. For the purpose of maintaining bridge balance, the relative impedances of both of these arms, must be kept substantially the same, and yet for the purpose of correcting for the variations of bridge impedances with temperature, at least one of these two strain gage impedances must be effectively modified so that its changes in value with temperature will, when effective in the bridge circuit with the other strain gages also simultaneously undergoing changes in impedance with temperature, maintain a substantially balanced condition enabling the bridge outputs to remain essentially free of substantial temperature-induced errors. Depending upon the sense of correction needed, the bridge balance and the correction for different temperature coefficients are achieved by placing simple external resistances, which are not materially temperature-sensitive, in series and in shunt relationship with one or both of the impedance arms in question. The needed connections are readily made via the aforementioned leads brought out through the sealed transducer unit. Typically, it suffices to have a single simple resistance of value relatively low in relation to the normal gage resistance connected in series with the gage in the one of the arms having the highest resistance and temperature coefficient, and to have a further single simple resistance of value relatively high in relation to the normal gage resistance connected in shunt relationship with the same gage. Together, these resistances and the associated strain gage yield a total bridge arm resistance which is the resistance needed to preserve bridge balance, and, for the most theoretically precise compensation, there are but two predetermined values for these resistances, which may be calculated or determined empirically. As a common practical matter, these resistances need not be of the theoretically precise values, however.

Figure 2:
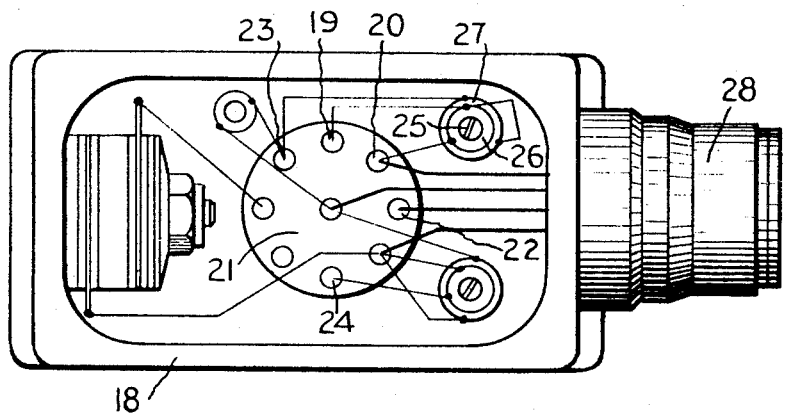
Figure 3:
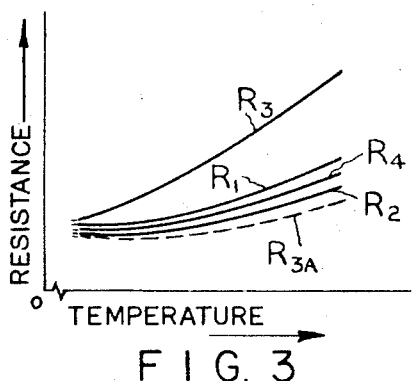
Figure 4:
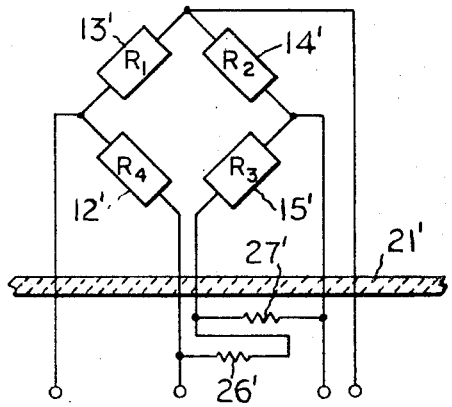
Figure 5:
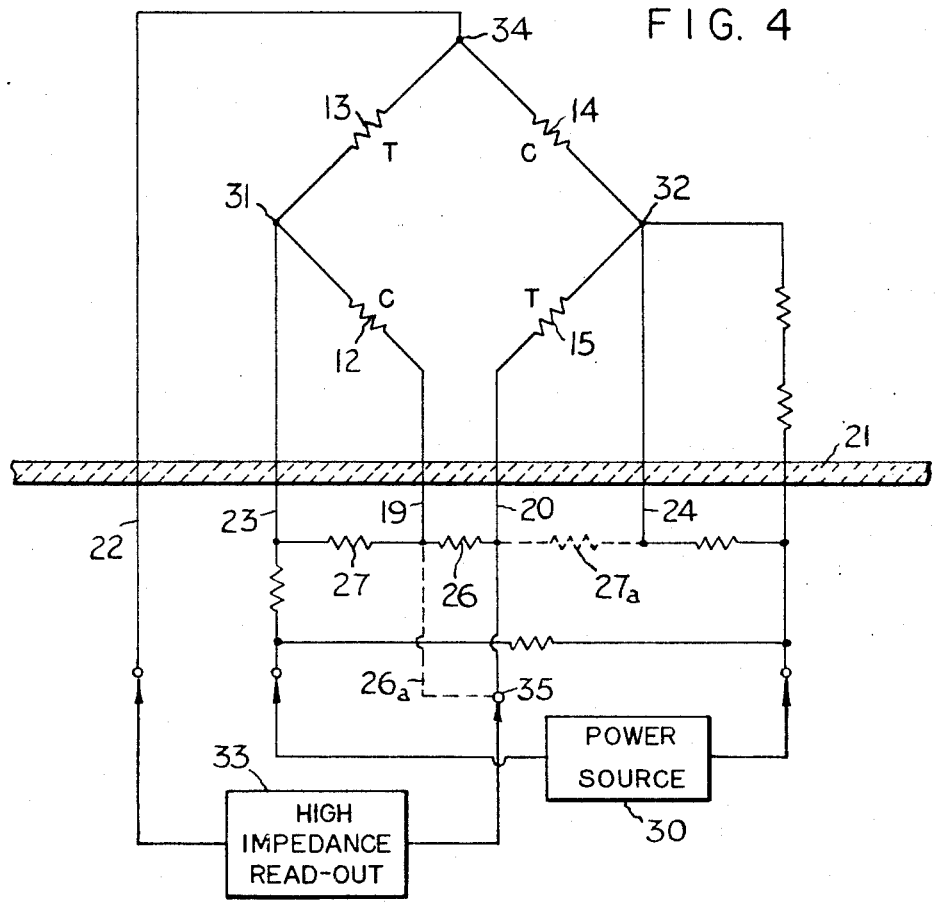

Although the aspects of this invention which are believed to be novel are set forth in the appended claims, additional details as to preferred practices of the invention and as to the further objects, advantages and features thereof may be most readliy comprehended through reference to the following description taken in connection with the accompanying drawings, wherein:

FIGURE 1 is a side view, with portions broken away to expose internal constructional details, of an improved temperature-compensated load-cell type of transducer employing semiconductor strain gage elements;

FIGURE 2 presents a side view of the terminal box and external connection assembly of the same transducer, taken along section line 2—2 in FIGURE 1;

FIGURE 3 graphically represents typical resistance vs. temperature characteristics for the individual semiconductor strain gages associated with the transducer of FIGURE 1;

FIGURE 4 is a schematic representation of semiconductor strain gage elements in an open-cornered bridge assembly which has been closed, temperature-compensated, and balanced through interconnection with auxiliary external series and shunt resistances having negligible temperature coefficients; and FIGURE 5 is a further schematic representation, of the temperature-compensated and balanced semiconductor strain gage network for the transducer of FIGURE 1, shown in association with a block-diagrammed excitation source and read-out device.

The assembly depicted in FIGURE 1 is that of a hermetically-sealed transducer including a known form of a ring-shaped strain-sensitive element 6 disposed centrally of a hollow cylindrical casing or housing 7, with one end being secured within an annular base 8 which is welded to the casing, and with the other relatively free end, 9, being held laterally in alignment within and sealed to the casing by a pair of spaced annular diaphragms 10 and 11. Four electrical semiconductor (ex. P-type silicon) resistance strain gage elements, 12–15, are affixed in one representative array with the strain-sensitive element 6, these being located along the interior ring surfaces defining the ring opening 16. Compressive forces along the loading axis 17—17 develop tension in the diametrically-opposite gages 13 and 15 disposed along that axis, while the diametrically-opposite gages 12 and 14 simultaneously experience compression. The situations would of course be reversed for loadings in tension along axis 17—17. In accordance with conventional practices, these gages would normally be electrically interconnected within sealed casing 7 to form a bridge circuit, and the four resulting junctions would be brought outside to the terminal box 18 through a hermetic (ex., glass-to-metal) seal for connection with input and output equipment. For the present compensation purposes, however, at least one of the usual four junctions or "corners" of the bridge circuit is instead left open, and both leads from the adjacent strain-gage arms which would otherwise have been connected together are separately brought through the same seal to the hollow interior of the external terminal box 18. Such separate leads are identified by reference characters 19 and 20 in FIGURE 2, and the other leads illustrated in association with the circular insulating seal 21 include terminal leads 22–24 connected with the three internally-wired junctions or corners of the same bridge. For the purpose of compensation for differences in unmatched temperature coefficients of the semiconductor strain gages 12–15 which happen to be associated with one another in the transducer, two external resistances 26 and 27, shown stacked on the same post 25 within the externally-accessible unsealed hollow terminal box 18, are connected with the "open-corner" terminals 19 and 20. Connector 28 couples the various terminals to a remote source, indicator, and the like. Importantly, these simple resistances 25 and 26 possess negligible temperature coefficents and may, for example, be made of a material such as constantan, yet they effect corrections for the different temperature coefficients of the randomly-selected unmatched semiconductor gages 12–15 in a manner and for reasons described in greater detail hereinbelow.

Typically, the distributions of temperature coefficient curves for four P-type silicon strain gages may be as represented in FIGURE 3, wherein the curves $R_1$ and $R_4$ of resistance vs. temperature are labelled to correspond to the transducer semiconductor gages $R_1$ and $R_4$ in FIGURE 4 (also identified by reference characters 12'–15' to denote their being counterparts of or the same as the gages 12–15 in FIGURE 1). The bridge arm including resistance $R_3$ (or 15') is found to exhibit a higher temperature coefficient than the others, although its higher-offset pattern is generally like the others in shape. Without more, a bridge constituted of these gages would obviously yield outputs which reflect temperature-induced errors. In accordance with the present teachings, however, the impedances exhibited by the offending bridge arm (including semiconductor gage $R_3$ in the case under consideration) are intentionally modified in a special way by external impedances (such as resistances 26' and 27' corresponding to the aforesaid resistances 26 and 27) to produce a resulting effective temperature-coefficient curve $R_{3A}$. This curve characterizes the resistance vs. temperature conditions for the bridge arm when it includes a suitable series resistance 26' and shunt resistance 27', as shown in FIGURE 4, which both have negligible temperature coefficients. It should be understood, of course, that these resistances may instead be made of materials exhibiting appreciable temperature coefficients but may be disposed at locations remote from the transducer cell where they will remain at essentially room temperature and thus not actually display any substantial temperature-coefficient effects in use. Resistances 26' and 27' are selected to cause the resulting resistance vs. temperature curve $R_{3A}$ for the arm including them and strain gage $R_3$ to satisfy the bridge equation $R_1R_{3A}-R_2R_4=0$. Because the temperature-coefficient patterns for all of the curves $R_1$, $R_2$, $R_{3A}$ and $R_4$ are substantially the same (i.e., even though their magnitudes of resistances are slightly different at different temperatures, they remain in substantially the same proportions), the aforesaid bridge equation will hold for the different temperatures to which the gages are all exposed simultaneously in the same transducer, and the semiconductor bridge will remain in balance regardless of the temperature variations.

Either a series or shunt resistance in the arm having the highest temperature coefficient will be effective to reduce the effective temperature coefficint of that arm (i.e., in the case of bridge arm including semiconductor gage $R_3$, will tend to lower the curve $R_3$, in FIGURE 3, toward the desired orientation of curve $R_{3A}$). Unfortunately, any such change will also produce a change in the balance of the entire bridge, and thus introduces another vexing problem. However, it is uniquely recognized in connection with this problem that the bridge unbalance resulting from the connection of a resistance in shunt with a gage arm (i.e., the arm impedance is lowered), is in direction or sense opposite to the bridge unbalance which results from the connection of a resistance in series with a gage arm (i.e., the arm impedance is increased). Accordingly, the present invention is based upon these various recognitions and yields both bridge balance and compensation for different temperature coefficients, simultaneously. The two resistances used for this purpose are respectively in series and shunt relationship with the gage in a high temperature-coefficient arm; each operates with two functions: first, to lower the effective temperature coefficient of that arm, and second, to maintain bridge balance. In these operations, the resistances are interdependent. Together, their effects on temperature coefficient are cumulative, and, together, they essentially offset the bridge unbalances caused by their presence, electrically, in the bridge arm. Characteristically, the series resistance 26′ and shunt resistance 27′, in the circuitry of FIGURE 4, are relatively low and relatively high when compared with the normal resistance exhibited by the associated gage 15′ (or $R_3$) when the transducer is unloaded. As a practical matter, it is found that semiconductor gages which are the more sensitive to temperature, as witnessed by higher temperature-coefficient curves, are also the more sensitive to strains being measured, and therefore their losses in sensitivity due to addition of the shunt and series resistances are not as severe a drawback as might otherwise be the case.

The "open-cornered" transducer construction readily permits the series and shunt resistances to be placed in either of the adjacent bridge arms forming that corner. It is not essential, in a full bridge, that either of the two gages in these adjacent arms be the one exhibiting the highest temperature coefficient for the lot, because the electrical character of the bridge is such that modification in impedance in either of these gage arms will be just as effective, electrically, as a direct modification of the impedance of its diagonally-opposite arm. It is more convenient in the present discussion, however, to consider the cases where the offending (highest temperature coefficient) arm appears at the open corner of the bridge; in practice, it is advantageous that one need not intentionally arrange the gages so that they are wired in this type of an array. Moreover, it should be understood that in some instances it may develop that one of the resistances will best be placed in series with one of the externally-accessible arms and the other in shunt with another arm. Also, the specific resistance interconnections illustrated in FIGURE 4 (of a resistance in series with the parallel combination of a semiconductor gage and another resistance) may be modified so that one of the resistances is shunted in parallel across the series combination of a semiconductor gage and a resistance in series with it. Considering the latter example, for purposes of establishing what the proportions of these resistances are for an optimum compensation, and, letting:

$R_1$, $R_2$, $R_3$ and $R_4$ equal the resistance of each of four semiconductor bridge gages at some first temperature, such as room temperature, and $R_1'$, $R_2'$, $R_3'$ and $R_4'$ equal the resistances of these same bridge gages at a second higher temperature, and V equal the bridge output at the first temperature, and V′ equal the bridge output at the second temperature, then, characteristically:

$$V = \frac{R_1 R_3 - R_2 R_4}{(R_1 + R_2)(R_3 + R_4)}$$

and $$V' = \frac{R_1' R_3' - R_2' R_4'}{(R_1' + R_2')(R_3' + R_4')}$$

With V′>V>0, then it follows that the auxiliary series resistance $r_1$ and shunt resistance $r_2$ should be either in the bridge arm containing gage $R_3$ or the arm containing gage $R_1$.

Assuming these auxiliary resistances (having negligible temperature coefficients) are connected with the leads accessible from gage $R_3$, then it can be shown that the bridge necessarily remains in balance substantially independently of temperature if:

$$r_1 = \frac{-b \pm \sqrt{b^2 - 4ac}}{2a}$$

and $$r_2 = \frac{R_2 R_4 (r_1 + R_3)}{R_1 r_1 + R_1 R_3 - R_2 R_4}$$

where:
$a = R_2 R_4 R_1' - R_2' R_4' R_1$ $b = R_1' R_3' R_2 R_4 - R_2 R_4 R_2' R_4' + R_2 R_4 R_3 R_1' - R_2' R_4' R_1 R_3 + R_2' R_4' R_2 R_4 - R_2' R_4' R_3' R_1$ $c = R_2 R_4 R_3 R_1 R_3' - R_2 R_4 R_3 R_2' R_4' - R_2' R_4' R_3' R_1 R_3 + R_2' R_4' R_3' R_2 R_4$ and $$ar^2 + br_1 + c = 0$$

In a typical case where:

$R_1 = 350$ ohms, $R_2 = 350$ ohms, $R_3 = 351$ ohms, and $R_4 = 349$ ohms and $R_1' = 400$ ohms, $R_2' = 400$ ohms, $R_3' = 402$ ohms, and $R_4' = 398$ ohms then $r_1$, the series resistance, is 4.58 ohms and $r_2$, the shunt resistance in parallel with the series combination of $r_1$ and $R_3$, is 18,860 ohms.

Both bridge balance and temperature-coefficient correction result. Although only two specific values of auxiliary resistance satisfy the requirements for optimum compensation, they need not be exact in practice, and some discrepancies are permissible with excellent compensations being achieved nevertheless. Nor is it necessary to perform detailed calculations in every instance, inasmuch as graphs and charts are readily devised to permit selections of the resistances which are to be used. Also, the desired compensations may be effected empirically, by substituting various resistances from suitable decade boxes which afford a wide variety of resistances for trial, the desired resistance units then being soldered in place. Knowing what the four bridge resistances are at two different temperatures, and knowing the directions in which bridge unbalances occur, as evidenced by simple output readings, it is a routine matter to establish the bridge arm or arms where the auxiliary resistances belong, and one may calculate, consult prepared charts or graphs, or merely substitute various resistances, all in accordance with the aforesaid principles, to effect the connections and proportioning of the auxiliary resistances.

FIGURE 5 illustrates a semiconductor strain gage network corresponding to that employed with the transducer of FIGURES 1 and 2. Responses in tension (T) and compression (C) are labelled for the semiconductor strain gages 12–15, and the "open" corner 29 is identified with its leads 19 and 20 individually sealed in insulated relationship through the glass-to-metal type seal member 21 of the transducer. A suitable electrical power source 30 applies excitation to the input terminals 31 and 32, while a known form of high impedance read-out device 33 is coupled with the bridge ouput terminals 34 and 35 (connection with the latter being established via the "open" corner leads). In the illustrated arrangement, the auxiliary series and shunt resistances 26 and 27 are connected with the bridge arm including semiconductor strain gage 12. Alternatively, where the compensations are to be effected through the bridge arm including strain gage 15, the shunt resistance 27 would simply be connected in the position illustrated by dashed linework 27a, and the series resistance 26 would simply be connected with read-out device 33 by the connection 26a shown in dashed linework. The other illustrated but unlabelled circuit impedances are not uniquely associated with the compensation arrangement under discussion.

It should be understood that the specific embodiments and practices herein described have been presented by way of disclosure rather than limitation, and that various modifications, substitutions and combinations may be effected without departure in spirit or scope from this invention in its broader aspects.

What I claim as new and desire to secure by Letters Patent of the United States is:

1. Strain gage transducer apparatus comprising a force-responsive member, an electrical bridge network including electrical semiconductor strain gages responsive to strains exhibited by said force-responsive member and exhibiting resistances which change in temperature to different extents and which have substantially the same temperature-coefficient pattern, said network having two input and two output terminals, first and second substantially constant resistances having substantially negligible change in resistance with changes in temperature of said semiconductor strain gages, means connecting said first resistance in series relationship with one of said semiconductor strain gages in said bridge network, and means connecting said second resistance in shunt relationship with one of said semiconductor strain gages in said network, said first resistance being of value which is low and said second resistance being of value which is high in relation to the resistances of said strain gages, and the values of said first and second resistances being substantially the two predetermined values which both produce a substantially zero temperature coefficient and substantially a balanced condition of said bridge network.

2. Strain gage transducer apparatus comprising a force-responsive member, an electrical strain gage bridge network including a plurality of electrical semiconductor strain gages in different arms of said network and each responsive to strains exhibited by said force-responsive member, at least one of said semiconductor strain gages exhibiting extents of resistance changes with temperature which are greater than those of the other of said gages but of substantially the same pattern, means directly connecting arms of said strain gage bridge network together to form three of the four corners of said bridge network, first and second substantially constant resistances having substantially negligible change in resistance with changes in temperature of said semiconductor strain gages, means connecting said first resistance in series relationship with one of said semiconductor strain gages in said bridge network and thereby forming a connection of the fourth corner of said bridge network, means connecting said second resistance in shunt relationship with one of said semiconductor strain gages in said network, said first resistance being of value which is low and said second resistance being of value which is high in relation to the resistances of said strain gages, both of said resistances reducing the effective temperature coefficient of said bridge and each of said resistances tending to unbalance said bridge network in a different sense and by amounts which substantially offset the unbalancing effects of the other, means substantially for applying input voltage to one pair of the four corners of said bridge network, and means for sensing the output voltages developed at the other pair of the four corners of said bridge network.

3. Strain gage transducer apparatus as set forth in claim 2 further including sealed casing means enclosing therein at least part of said force-responsive member and all of said semiconductor strain gages and said means directly connecting said three corners of said network, and sealed means bringing to the exterior of said casing electrical connections from said three corners of said network and from each of the ends of the two gages which form the fourth corner of said network, and wherein said first and second resistances are electrically connected with said strain gages externally of said casing.

4. Strain gage transducer apparatus as set forth in claim 2 wherein each of said first and second resistances is of a material having a substantially negligible temperature coefficient, and wherein said network includes four bridge arms each containing a single different P-type silicon semiconductor strain gage.

5. Strain gage transducer apparatus comprising a force-responsive member, an electrical bridge network including four electrical semiconductor strain gages each in a different arm of said network and each responsive to strains exhibited by said force-responsive member, at least one of said semiconductor strain gages exhibiting extents of resistance changes with temperature which are greater than those of the other of said gages but of substantially the same pattern, first and second substantially constant resistances having substantially negligible changes in resistance with temperature, means electrically connecting said strain gages and resistances together in a bridge circuit relationship with each of said strain gages in a different arm thereof and with said first resistance in a series relation and said second resistance in shunt relation to said one of said semiconductor gages in one of the bridge arms exhibiting said greater extents of resistance changes with temperature, said first resistance being of value which is low and said second resistance being of value which is high in relation to the resistance of said one of said semiconductor strain gages, each of said resistances having a predetermined value which in part reduces the effective temperature coefficient of said one of said gages and which together with the other of said resistances reduces the temperature coefficient of said bridge network substantially to zero, and the values of each of said resistances further tending to unbalance said bridge network in a different sense and by amounts which substantially offset the unbalancing effects of the other, means for making electrical input connections with two of the corners of said bridge network, and means for making electrical output connections with the other two corners of said bridge network.

6. Strain gage transducer apparatus as set forth in claim 5 wherein said second resistance is connected directly in parallel with said one of said semiconductor gages, and wherein said first resistance is connected in said one of said arms directly in series with the parallel combination of said second resistance and said one of said semiconductor gages.

References Cited
UNITED STATES PATENTS

| | | | |
|---|---|---|---|
| 2,672,048 | 3/1954 | Ruge | 73—88.5 |
| 2,814,946 | 12/1957 | Harris | 73—141 |
| 2,971,379 | 2/1961 | Weisheit | 73—362 |
| 3,245,252 | 4/1966 | First et al. | 73—88.5 |
| 3,246,510 | 4/1966 | Ruge | 73—141 |

OTHER REFERENCES

The Use of Unmatched Thermistors for the Measurement of Temperature Difference Under Varying Ambient Conditions, J.S.I., vol. 39, No. 7, July 1962.

RICHARD C. QUEISSER, Primary Examiner.

C. A. RUEHL, Assistant Examiner.

U.S. Cl. X.R.

73—141

UNITED STATES PATENT OFFICE
CERTIFICATE OF CORRECTION

Patent No. 3,447,362                                            June 3, 1969

Hsia S. Pien

It is certified that error appears in the above identified patent and that said Letters Patent are hereby corrected as shown below:

In the heading to the printed specification, after line 5, insert -- Application made under Rule 47. --.

Signed and sealed this 30th day of June 1970.

(SEAL)
Attest:

Edward M. Fletcher, Jr.                                WILLIAM E. SCHUYLER, JR.
Attesting Officer                                               Commissioner of Patents